United States Patent
Agnihotri et al.

(10) Patent No.: US 8,453,189 B2
(45) Date of Patent: May 28, 2013

(54) METHOD AND SYSTEM FOR RETRIEVING INFORMATION ABOUT TELEVISION PROGRAMS

(75) Inventors: Lalitha Agnihotri, Fishkill, NY (US); Angel Janevski, New York, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 4187 days.

(21) Appl. No.: 10/084,712

(22) Filed: Feb. 25, 2002

(65) Prior Publication Data

US 2003/0163828 A1    Aug. 28, 2003

(51) Int. Cl.
*H04N 7/173* (2011.01)
*G06F 3/00* (2006.01)

(52) U.S. Cl.
USPC ............... 725/113; 725/40; 725/51; 725/109

(58) Field of Classification Search
USPC ................... 725/40–46, 113, 51, 109
See application file for complete search history.

(56) References Cited

U.S. PATENT DOCUMENTS

| | | | | |
|---|---|---|---|---|
| 5,940,073 A | * | 8/1999 | Klosterman et al. | 715/721 |
| 6,240,555 B1 | * | 5/2001 | Shoff et al. | 725/110 |
| 6,263,507 B1 | * | 7/2001 | Ahmad et al. | 725/134 |
| 6,756,997 B1 | * | 6/2004 | Ward et al. | 715/716 |
| 6,757,482 B1 | * | 6/2004 | Ochiai et al. | 386/83 |
| 6,789,106 B2 | * | 9/2004 | Eyer et al. | 709/205 |
| 2001/0018771 A1 | * | 8/2001 | Walker et al. | 725/91 |

FOREIGN PATENT DOCUMENTS

| | | |
|---|---|---|
| EP | 0848554 A2 | 6/1998 |
| WO | WO9748230 | 12/1997 |
| WO | WO0178401 | 10/2001 |

* cited by examiner

*Primary Examiner* — Hoang-Vu A Nguyen-Ba
(74) *Attorney, Agent, or Firm* — Head, Johnson & Kachigian, P.C.

(57) ABSTRACT

The present invention is directed to a method and system for retrieving information about television programs. This includes a website being connected to that includes information about a television program being watched. The information from the website is downloaded and then processed. Further, the information is then either displayed along with the television program being watched or stored for later playback.

16 Claims, 2 Drawing Sheets

METHOD AND SYSTEM FOR RETRIEVING INFORMATION ABOUT TELEVISION PROGRAMS

FIELD OF THE INVENTION

The present invention relates to video data services and systems, and in particular, to a method and system for retrieving information about television programs.

DESCRIPTION OF THE RELATED ART

The development of computerized information resources, such as the Internet, allow users to communicate with various servers to retrieve electronic information that is unavailable in a normal electronic medium. A server is typically a remote computer system that is accessible over the Internet. The function of a server is to scan and search for information sources in response to a user's request. As such, electronic information is presented to a user in hypertext in which text, images, sounds, and action are linked together in complex associations that permit the user to browse through related topics.

A user (or client) can link to the server utilizing the functionality provided by a hypertext transfer protocol (HTTP). Active within the client is a process known as a "browser," which establishes the connection to the server and presents information to the user in the form of HTTP responses (or web pages). The World Wide Web (WWW) includes all servers adhering to this protocol, and these servers are accessible by users (or clients) via a Universal Resource Locator (URL). Hence, one can gain access to Internet services by specifying Universal Resource Locators that have two basic components: a protocol to be used and an object pathname. For example, the Universal Resource Locator address, "http://www.nbc.com" specifies a hypertext transfer protocol ("http") and a pathname of the server ("www.nbc.com"). The server name is associated with a unique numeric value (TCP/IP address).

In a number of electronic devices on the market today such as televisions, personal video recorders and set top boxes, Electronic Program Guides (EPG) and services have been incorporated. An EPG is an on screen menu that enable viewers to select what programs to be watched or recorded in the case of a personal video recorder. EPGs typically include a short summary about the particular programs being broadcast that day. However, such EPGs do not give more significant information about the program such as the history or background of the program nor does it give information about similar events in other episodes of the program. Accordingly, there is a need for providing such information to a viewer.

SUMMARY OF THE INVENTION

The present invention is directed to a method for retrieving information about television programs. The method includes a web site being connected to that includes information about a television program being watched. The information from the web site is downloaded and then processed. Further, the information is then either displayed along with the television program being watched or stored for later playback.

The present invention is also directed to a video processing system. The system includes a means for connecting to a website that includes information about a television program being watched. Also, included is a means for downloading the information from the website and a means for processing the information. Further, included is either a means for displaying the information along with the television program being watched or a means for storing the information for later playback

Figure 1:
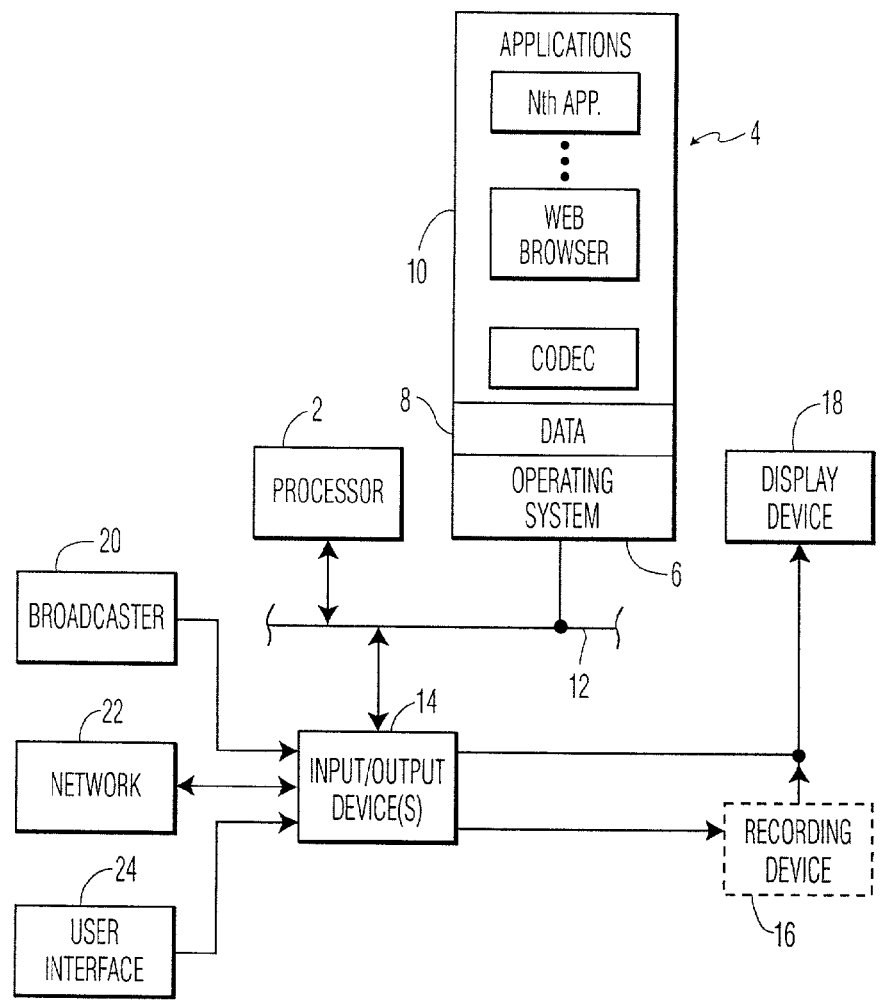
FIG. 1 is a block diagram of a video processing system in which the invention may be implemented.

It is to be understood that these drawings are solely for purposes of illustrating the concepts of the invention and are not intended as a definition of the limits of the invention. It will be appreciated that the same reference numerals, possibly supplemented with reference characters where appropriate, have been used throughout to identify corresponding parts.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention maybe practiced in other embodiments, which depart from these specific details. Moreover, for the purpose of clarity, detailed descriptions of well-known devices, circuits, and methods are omitted so as not to obscure the description of the present invention with unnecessary detail.

FIG. 1 shows a video processing system 10 in which the method for retrieving information about television programs in accordance with the present invention may be implemented. As will be described in greater detail below, the system may represent or incorporate a television, a set-top box, a desktop, laptop or palmtop computer, a personal digital assistant (PDA), a video storage device such as a videocassette recorder (VCR), a digital video recorder (DVR), an optical disk, magnetic disk or solid state based recorder such as a TiVO or ReplayTV device, etc., as well as portions or combinations of these and other devices.

As can be seen, the system includes one or more input/output devices 14. The input/output devices 14 interface a broadcaster 20, a network 22 and a user interface 24 to the rest of the system. The broadcaster 20 provides the television programs that are watched by a viewer during operation. The broadcaster may represent any service provider such as a terrestrial broadcast system, a cable network, a satellite network or an internet network that broadcasts content.

According to the present invention, the system will connect to the network 22 in order to download the information about the program being watched by the user. The network 22 may represent a global computer communications network such as the Internet, a wide area network, a metropolitan area network, a local area network, a wireless network, or a telephone network, as well as portions or combinations of these and other types of networks. The user interface 24 will enable a user to command and operate the system and may represent a remote control, a keyboard or other similar device.

As can be further seen, the system also includes a processor 2 and a memory 4. The input/output device(s) 14, processor 2 and memory 4 communicate over a communication medium 12. The communication medium 12 may represent, e.g., a bus, a communication network, one or more internal connections of a circuit, circuit card or other device, as well as portions and combinations of these and other communication media. Information or signals received via the input/output devices 14 are processed, in accordance with one or more software programs stored in memory 4 and executed by processor 2. Alternatively, dedicated hardware or firmware configured to operate in like manner may be used.

In particular, the memory 4 is divided into a number of areas for storing an operating system 6, data 8 and a number of applications 10. Included in these applications is a codec for decoding incoming video to be displayed and for coding video to be stored. The codec may be embodied by a MPEG-1, MPEG-2, MPEG-4 or other known standard.

A web browser is also included in the applications. During operation, the web browser will be used to connect to the network 22 in order to download the information about the program being watched by the user. It should be noted that any number of commercially or publicly available browsers can be utilized in various implementations in accordance with the preferred embodiment of the present invention. For example, a browser such as Netscape™ (a trademark of Netscape, Inc.) can be utilized in accordance with a preferred embodiment of the present invention to provide the functionality specified under HTTP.

An EPG may also be another application included in the memory 4. As previously described, an EPG enable users to select what programs to be watched or recorded. If the EPG is stored in the memory 4, it would be updated via the broadcaster 20 or network 22 during operation. However, alternatively, the EPG may be provided to the system as a service via the broadcaster 20 or network 22. An example of such a service is the one provided by Gemstar, which is transmitted in the vertical blanking interval of the broadcast signal. It should also be noted that an EPG may also include one or more tags that provide links to websites for the programs listed in the EPG. These tags may be used by the present invention, which will be described in detail later.

As can be further seen, a display device 18 is also included. During operation, the programs from the broadcaster 20 and the information downloaded from the network 22 may be shown on the display device 18. Alternatively, the information downloaded from the network 22 may be stored for later viewing by the user. In this case, a recording device 16 may also be included in the system if the downloaded information exceeds the capacity of the memory 4. The recording device may be embodied by a hard drive, a recordable DVD or other similar mass storage device.

It should be understood that the particular configuration of the system as shown in FIG. 1 is by way of example only. Those skilled in the art will recognize that the invention can be implemented using a wide variety of alternative system configurations.

Figure 2:
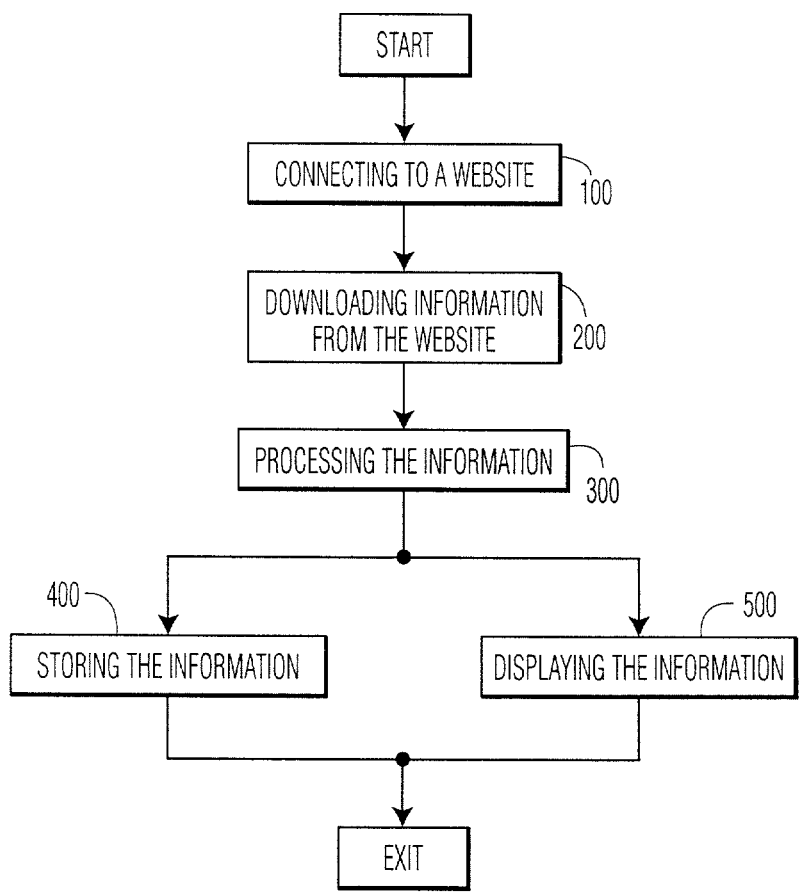
FIG. 2 is a flow diagram for downloading information about television programs in accordance with an illustrative embodiment of the invention that may be implemented in the video processing system of FIG. 1.

FIG. 2 shows a flow diagram of one example of a method for retrieving information about the television programs in accordance with an illustrative embodiment of the invention. It should be noted that the method of FIG. 2 maybe implemented as a computer readable code stored and executed for example in the system of FIG. 1. However, alternatively, hardware circuitry may be used in place of, or in combination with, software instructions to implement this method.

During operation, while watching a program, the user may decide that he desires additional information about the program currently being watched. Depending on the type of query, the information may include a particular item or event of the program. The information may also include a particular character's role in the program, a description of a particular program in a series, a history of the series or a summary of other episodes. The information may also be in the form of audio clips or applications such as games etc. In other embodiments, this information may include for example either textual information or video footage of similar events in other episodes. If so, a user input will be sent to request such information for example by sending a command via the user interface of FIG. 1.

In response, the method of FIG. 2 will be initiated and advance to step 100. In Step 100, a connection to a website including the information about the program being watched is made in response to the user input. Today, many of the television programs being broadcast have websites that include such information as histories, summaries of other episodes and other related information. An example of such a website is "www.dawsons-creek.com". Also, according to the present invention, specialized websites would be developed that include such information mentioned above and in addition include actual video footage or textual information of other episodes.

In the system of FIG. 1, step 100 would be accomplished by the web browser being activated in response to a command from the user interface 24. The web browser would make a connection to the network 22 in order to locate the website. In one embodiment, the website would be located by using tags included in the EPG. As previously described, EPGs may includes tags that provide links to websites for the programs listed in the EPG. Thus, in this embodiment, the browser would go to the EPG and find the tag of the program currently being watched by the user and make a connection to the website corresponding to that tag via the network 22. In another embodiment, the website would be located by performing a search on the network 22. This could be accomplished by a variety of known search engines using the name of the program being watched. In a further embodiment, would be located by using a predetermined address of a website that maybe stored, downloaded or otherwise acquired by a system implementing this method.

Still referring to FIG. 2, in step 200, the method will then download the information about the program being watched from the website. In the system of FIG. 1, this would be accomplished by the browser extracting the information about the program from the website and then transmitting it back to the system via the network 22. The extracting of the information would be performed by a well-known method such as the one described in a MS Thesis entitled "University IE: Extracting Information From University Web Pages", University of Kentucky, Lexington, 2000, by A. Janevski.

Further, an episode "Parallels" description from the Star Trek: The Next Generation series is available on the Web. "http://www.startrek.com/library/tng_episodes/episodes_tng_detail_68632.asp" The five-paragraph text could be processed in a variety of ways. Few of these are presented below:

1. Summarize-then-extract

In this case, the text is first summarized and that way reduced to a relatively small number of sentences. Many text-processing solutions provide summarization of natural-language texts such as IBM's Intelligent Miner for Text http://www-4.ibm.com/software/data/iminer/fortext/index.html. The text from the summarization is then used as input to IE.

An example IE task is the one that looks for portions of the text where a verb is found between two Character names. All occurrences are then extracted as structures: (verb, character 1, character 2).

2. Extract from entire text

In this case, IE tasks are executed over the entire episode description. In this case, a different task could be used to look for a character name, place name and a verb in a sentence which would generate output structured as: (character name, verb, place name).

In a relatively limited domain such as soap operas or sitcoms where the characters usually are engaged in a limited number of activities (e.g. breakup, engage, marry, divorce, fire, hire, etc) dedicated IE tasks can be defined that would match the domain. Such tasks can then be able to extract only events that are "relevant" to the summary.

In one embodiment, the information downloaded in step 200 would be either textual information or actual video clips of similar events in other episodes. In order to accomplish this, step 200 would have to identify similar events in other episodes on the website. According to the present invention, this would be accomplished by the use of metadata that is capable of identifying specific events. This metadata may be inserted in the content of the programs being broadcast, be delivered prior to the broadcast or via a different channel, or be available from a different source such as internet website. One example of such metadata would take the form of Person 1, Person 2, event). In the case of Dawson's Creek, the metadata identifying Joey's and Dawson's second break would be (Joey, Dawson, breakup #2). Therefore, any event that relates to Joey's and Dawson's second breakup in other episodes would be tagged with this particular example of metadata.

Moreover, during operation, step 200 would take the metadata corresponding to the event of the program being currently watched at the time of the user input and then compare it to the metadata included in the other episodes included on the website. Where there is a match, the textual information or actual video clips would be extracted and then transmitted back via the network 22 in step 200, as described above.

In step 300, the information downloaded from the website is processed. Such processing would include formatting the information to be either stored or displayed. Also, the actual information may be processed. For example, the summaries of the other episodes would be analyzed and condensed into a single summary or history. Alternatively, the summaries would be analyzed in order to highlight information only from the beginning few and most recent episodes in order to give a more compact history or summary.

Further, a more sophisticated summarization and linking may be performed in step 300 in order to provide a more coherent summary. An example of such is described in article entitled "A Practical Text Summarizer, in Advances in Automatic Text Summarization", by T. Strzalkowski, G. Stein, J. Wang and B. Wise, MIT Press, 1998. In step 300, the programs may alternatively be summarized as being broadcast and the summary then stored for later viewing. One example of such a method for summarizing a program is described U.S. patent application Ser. No. 09/712,681, entitled "Method and Apparatus for the Summarization and Indexing of Video Programs", filed on Nov. 14, 2000, assigned to the same assignee herein. A method for summarizing video information is described in article entitled "Condensing Computable Scenes Using Visual Complexity and Film Syntax Analysis", by H. Sundaram and S. F Chang, IEEE conference on Multimedia and Exhibition, Tokyo, Japan, Aug. 22-25, 2001.

In the embodiment, where the information downloaded is video clips of similar events, step 300 would edit and combine all of the video clips into a single video sequence. It should be noted that the processing of step 200 such as the analyzing, summarizing and video editing may be performed off line prior to being downloaded. In this embodiment, step 300 would only have to format the information to be either stored or displayed.

As can be seen from FIG. 2, the processed information is either stored in step 400 or displayed 500. In the case where the processed information is textual information, it may be preferable to immediately display the information while the user is still watching the program in step 400. In this case, the system of FIG. 1 would display both the current program being watched along with the processed information on the display device 18. This would enable the user to get immediately updated so that the current program being watched would be better understood.

In the case where the processed information is video, it may be preferable to store the information in step 500 for later viewing. This is because displaying another video sequence while the user is watching the program may be too distracting. In this case, the system of FIG. 1 would store the processed information in the recording device 16 so that user may play it back later.

The foregoing merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Therefore, for example, it will be appreciated by those skilled in the art that the block diagrams herein represent conceptual views of illustrative circuitry embodying the principles of the invention.

Similarly, it will be appreciated that any flow charts, flow diagrams, state transition diagrams, and the like represent various processes which may be substantially represented in computer readable medium and so executed by a computer or processor, whether or not such computer or processor is explicitly shown.

The functions of the various elements shown in the FIGS. 1 and 2, including functional blocks labeled as "processors" maybe provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Their function maybe carried out through the operation of program logic, through dedicated logic, through the interaction of program control and dedicated logic, or even manually, the particular technique being selectable by the implementor as more specifically understood from the context.

In the claims, any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed:

1. A method for retrieving information about television programs, said method comprising the steps of:
   connecting to a website including information about an episode of a television program being watched;
   downloading the information from the website;
   processing the information including combining summaries of other episodes; and
   displaying the information along with the television program being watched.

2. The method of claim 1, where the information about the television program is selected from the group consisting of textual information, audio information, video information and applications.

3. The method of claim 1, where the information about the television program is selected from the group consisting of a particular item in the program, a particular event, a character's role in the program, a history of the program, a summary of other episodes of the program, individual summaries of other episodes and similar events in other episodes.

4. The method of claim 1, wherein the connecting to the website includes using a mechanism selecting from the group consisting of a tag from an electronic program guide that corresponds to the television program being watched, a search engine and a predetermined address of a website.

5. The method of claim 1, wherein downloading the information from the website includes:
   extracting the information from the website; and
   transmitting the information over a network.

6. The method of claim 1, wherein downloading the information from the website includes:
   identifying information about events in other episodes similar to an event in the television program being watched;
   extracting the information about events in other episodes from the website; and
   transmitting the information about events in other episodes over a network.

7. The method of claim 1, wherein processing the information includes combining video clips of events in other episodes similar to an event in the television program being watched.

8. A method for retrieving information about television programs, said method comprising the steps of:
   connecting to a website including information about an episode of a television program being watched;
   downloading the information from the website;
   processing the information; and
   displaying the information along with the television program being watched, wherein downloading the information from the website includes:
   identifying information about events in other episodes similar to an event in the television program being watched;
   extracting the information about events in other episodes from the website; and
   transmitting the information about events in other episodes over a network.

9. A video processing system, comprising:
   means for connecting to a website including information about an episode of a television program being watched;
   means for downloading the information from the website;
   means for processing the information including combining summaries of other episodes; and
   means for storing the information for later playback.

10. A method for retrieving information about television programs, said method comprising the steps of:
    connecting to a website including information about an episode of a television program being watched;
    downloading the information from the website;
    processing the information; and
    displaying the information along with the television program being watched,
    wherein processing the information includes combining video clips of events in other episodes similar to an event in the television program being watched.

11. The method of claim 10, wherein processing the information includes combining summaries of other episodes.

12. The method of claim 10, where the information about the television program is selected from the group consisting of textual and video information.

13. The method of claim 10, where the information about the television program is selected from the group consisting of a history of the program, a summary of other episodes of the program, individual summaries of other episodes and similar events in other episodes.

14. The method of claim 10, wherein connecting to the website includes using a mechanism selecting from the group consisting of a tag from an electronic program guide that corresponds to the television program being watched, a search engine and a predetermined address of a website.

15. The method of claim 10, wherein downloading the information from the website includes:
    extracting the information from the website; and
    transmitting the information over a network.

16. The method of claim 10, wherein downloading the information from the website includes:
    identifying information about events in other episodes similar to an event in the television program being watched;
    extracting the information about events in other episodes from the website; and
    transmitting the information about events in other episodes over a net-work.

* * * * *